United States Patent
Kakuta

(10) Patent No.: US 10,515,453 B2
(45) Date of Patent: Dec. 24, 2019

(54) IMAGE PROCESSING APPARATUS, IMAGE PROCESSING METHOD, AND STORAGE MEDIUM FOR PERFORMING AN EDGE CORRECTION PROCESSING BASED ON COLOR VARIATIONS

(71) Applicant: CANON KABUSHIKI KAISHA, Tokyo (JP)

(72) Inventor: Hitoshi Kakuta, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/649,285

(22) Filed: Jul. 13, 2017

(65) Prior Publication Data

US 2017/0309030 A1 Oct. 26, 2017

Related U.S. Application Data

(63) Continuation of application No. 14/709,904, filed on May 12, 2015, now Pat. No. 9,734,585.

(30) Foreign Application Priority Data

May 14, 2014 (JP) ................................. 2014-100846

(51) Int. Cl.
   *G06T 7/13* (2017.01)
   *G06K 9/46* (2006.01)
   *G06K 9/56* (2006.01)
   *G06K 9/62* (2006.01)

(52) U.S. Cl.
   CPC .............. *G06T 7/13* (2017.01); *G06K 9/4609* (2013.01); *G06K 9/4642* (2013.01); *G06K 9/4652* (2013.01); *G06K 9/56* (2013.01); *G06K 9/6212* (2013.01); *G06K 2209/01* (2013.01); *G06T 2207/10024* (2013.01); *G06T 2207/20021* (2013.01)

(58) Field of Classification Search
   None
   See application file for complete search history.

(56) References Cited

U.S. PATENT DOCUMENTS

| | | | | |
|---|---|---|---|---|
| 6,343,159 | B1* | 1/2002 | Cuciurean-Zapan | G06T 5/20 345/596 |
| 6,449,060 | B1* | 9/2002 | Kawai | H04N 1/40012 358/1.9 |
| 6,665,439 | B1* | 12/2003 | Takahashi | G06K 9/0063 382/165 |
| 6,753,976 | B1* | 6/2004 | Torpey | H04N 1/56 358/1.9 |

(Continued)

FOREIGN PATENT DOCUMENTS

| | | |
|---|---|---|
| JP | 2004-350240 A | 12/2004 |
| JP | 2008-059406 A | 3/2008 |

(Continued)

*Primary Examiner* — Andrae S Allison
(74) *Attorney, Agent, or Firm* — Canon U.S.A., Inc. IP Division

(57) ABSTRACT

An image processing apparatus counts at least one of the number of pixels having an identical color to a target pixel, the number of pixels having a similar color to the target pixel, and the number of pixels having a different color from the target pixel in a target window, and determines an attribute of the target pixel based on a result of the counting.

9 Claims, 5 Drawing Sheets

(56) References Cited

U.S. PATENT DOCUMENTS

| | | | | |
|---|---|---|---|---|
| 7,034,962 B2* | 4/2006 | Suzuki | H04N 1/58 | 358/2.1 |
| 7,092,124 B2* | 8/2006 | Nabeshima | H04N 1/40062 | 358/1.9 |
| 7,746,503 B2* | 6/2010 | Lim | G06K 15/02 | 358/1.9 |
| 8,797,601 B2* | 8/2014 | Yao | H04N 1/405 | 358/1.9 |
| 2001/0016073 A1* | 8/2001 | Li | H04N 1/40062 | 382/224 |
| 2002/0126315 A1* | 9/2002 | Nabeshima | G06T 5/20 | 358/3.03 |
| 2002/0136463 A1* | 9/2002 | Akahori | H04N 1/6072 | 382/260 |
| 2005/0249430 A1* | 11/2005 | Lim | H04N 1/4092 | 382/266 |
| 2008/0030812 A1* | 2/2008 | Mori | H03M 7/30 | 358/505 |
| 2008/0205765 A1* | 8/2008 | Fan | H04N 19/186 | 382/191 |
| 2010/0054586 A1* | 3/2010 | Yamazaki | G06K 9/342 | 382/164 |
| 2010/0054591 A1* | 3/2010 | Shiraishi | G06T 11/001 | 382/167 |
| 2010/0260417 A1* | 10/2010 | Dai | G06K 9/00456 | 382/165 |
| 2010/0277770 A1* | 11/2010 | Yao | H04N 1/58 | 358/3.06 |
| 2012/0114230 A1* | 5/2012 | Dai | G06K 9/00456 | 382/164 |
| 2015/0332115 A1* | 11/2015 | Kakuta | G06K 9/4652 | 382/165 |
| 2016/0255240 A1* | 9/2016 | Morovic | H04N 1/405 | |

FOREIGN PATENT DOCUMENTS

| | | |
|---|---|---|
| JP | 2008-205967 A | 9/2008 |
| JP | 2012-054709 A | 3/2012 |

* cited by examiner

FIG. 2

| BIT | 2 | 1 | 0 |
|---|---|---|---|
| | ATTRIBUTE BIT | ACHROMATIC COLOR BIT | EDGE BIT |

| ATTRIBUTE BIT | |
|---|---|
| 0x01 | CHARACTER PROCESSING |
| 0x00 | PHOTOGRAPHIC PROCESSING |

| ACHROMATIC COLOR BIT | |
|---|---|
| 0x01 | ACHROMATIC COLOR |
| 0x00 | CHROMATIC COLOR |

| EDGE BIT | |
|---|---|
| 0x01 | EDGE |
| 0x00 | NO EDGE |

FIG. 3A

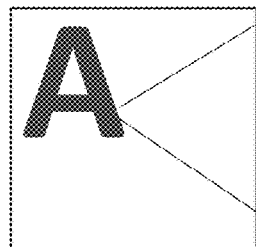

FIG. 3D

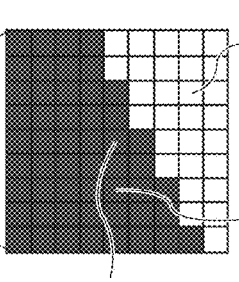

PIXEL HAVING DIFFERENT COLOR FROM TARGET PIXEL

PIXEL HAVING IDENTICAL COLOR TO TARGET PIXEL

TARGET PIXEL

FIG. 3G

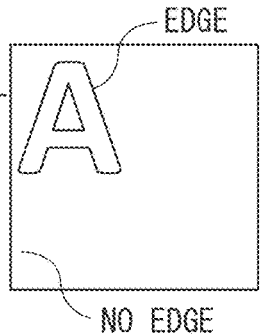

EDGE

NO EDGE

FIG. 3B

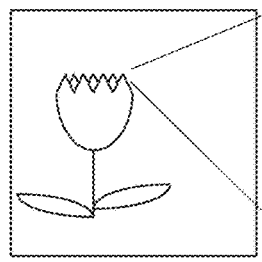

FIG. 3E

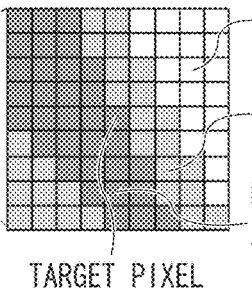

PIXEL HAVING DIFFERENT COLOR FROM TARGET PIXEL

PIXEL HAVING SIMILAR COLOR TO TARGET PIXEL

PIXEL HAVING IDENTICAL COLOR TO TARGET PIXEL

TARGET PIXEL

FIG. 3H

NO EDGE

FIG. 3C

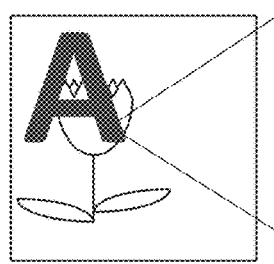

BACKGROUND

FIG. 3F

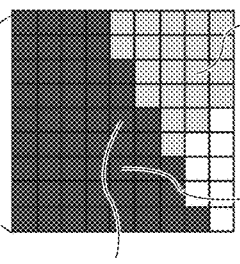

PIXEL HAVING DIFFERENT COLOR FROM TARGET PIXEL

PIXEL HAVING IDENTICAL COLOR TO TARGET PIXEL

TARGET PIXEL

FIG. 3I

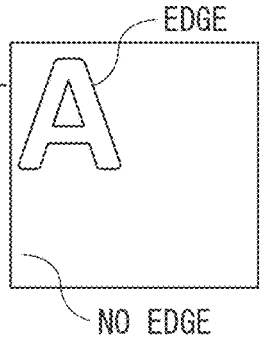

EDGE

NO EDGE

IMAGE PROCESSING APPARATUS, IMAGE PROCESSING METHOD, AND STORAGE MEDIUM FOR PERFORMING AN EDGE CORRECTION PROCESSING BASED ON COLOR VARIATIONS

CROSS-REFERENCE TO RELATED APPLICATIONS

This application is a continuation, and claims the benefit, of U.S. patent application Ser. No. 14/709,904, presently pending and filed on May 12, 2015, and claims the benefit of, and priority to, Japanese Patent Application No. 2014-100846, filed May 14, 2014, which applications are hereby incorporated by reference herein in their entireties.

BACKGROUND OF THE INVENTION

Field of the Invention

The present invention relates to an image processing apparatus, an image processing method, and a storage medium.

Description of the Related Art

A technique for detecting an edge of an input image is conventionally known. Japanese Patent Application Laid-Open No. 11-55503 discusses an image processing apparatus which performs image processing for improving edge reproducibility on a pixel determined to be an edge as a result of the edge detection, and does not perform the above-described image processing on a pixel not determined to be an edge.

However, the conventional edge detection method detects not only character and line edges but also edges existing in a photograph. Therefore, if the image processing for improving edge reproducibility is intensively performed, unnatural contours appear in a photograph.

SUMMARY OF THE INVENTION

According to an aspect of the present invention, an image processing apparatus includes a targeting unit configured to target a pixel and shift the target pixel by one pixel, a counting unit configured to, each time the pixel targeted by the targeting unit is changed, provide a window centered around the target pixel and count the number of pixels having an identical color to the target pixel in the window, and a determination unit configured to determine that the target pixel is a character pixel in a case where the count value obtained by the counting unit is equal to or greater than a threshold value.

According to another aspect of the present invention, an image processing apparatus includes a first counting unit configured to count the number of pixels having an identical color to a target pixel in a target window, a second counting unit configured to count the number of pixels having a similar color to the target pixel in the target window, a third counting unit configured to count the number of pixels having a different color from the target pixel in the target window, and a determination unit configured to determine that the target pixel is a character pixel in a case where a count value by the first counting unit is equal to or greater than a threshold value, a count value by the third counting unit is equal to or greater than a threshold value, and a count value by the second counting unit is smaller than a threshold value.

According to still another aspect of the present invention, an image processing apparatus includes a first counting unit configured to count the number of pixels having an identical color to a target pixel in a target window, a second counting unit configured to count the number of pixels having a similar color to the target pixel in the target window, and a third counting unit configured to count the number of pixels having a different color from the target pixel in the target window. In a case where a count value obtained by the first counting unit is equal to or greater than a threshold value, a count value obtained by the third counting unit is equal to or greater than a threshold value, a count value obtained by the second counting unit is smaller than a threshold value, and the target pixel is gray, the target pixel is expressed in K monochrome.

According to the present invention, it is possible to detect character and line edges while reducing detection of edge pixels existing in a photograph.

Further features of the present invention will become apparent from the following description of exemplary embodiments with reference to the attached drawings.

BRIEF DESCRIPTION OF THE DRAWINGS

FIG. 2 illustrates an example of a data structure of an attribute image according to the present exemplary embodiment.

FIGS. 3A, 3B, 3C, 3D, 3E, 3F, 3G, 3H and 3I illustrate portions detected by an edge detection unit according to the present exemplary embodiment.

DESCRIPTION OF THE EMBODIMENTS

Exemplary embodiments of the present invention will be described below with reference to the accompanying drawings.

A first exemplary embodiment will be described below. As the first exemplary embodiment, the following describes an example of an image processing apparatus for detecting character and line edges while restricting detection of edges in a photograph.

Figure 1:
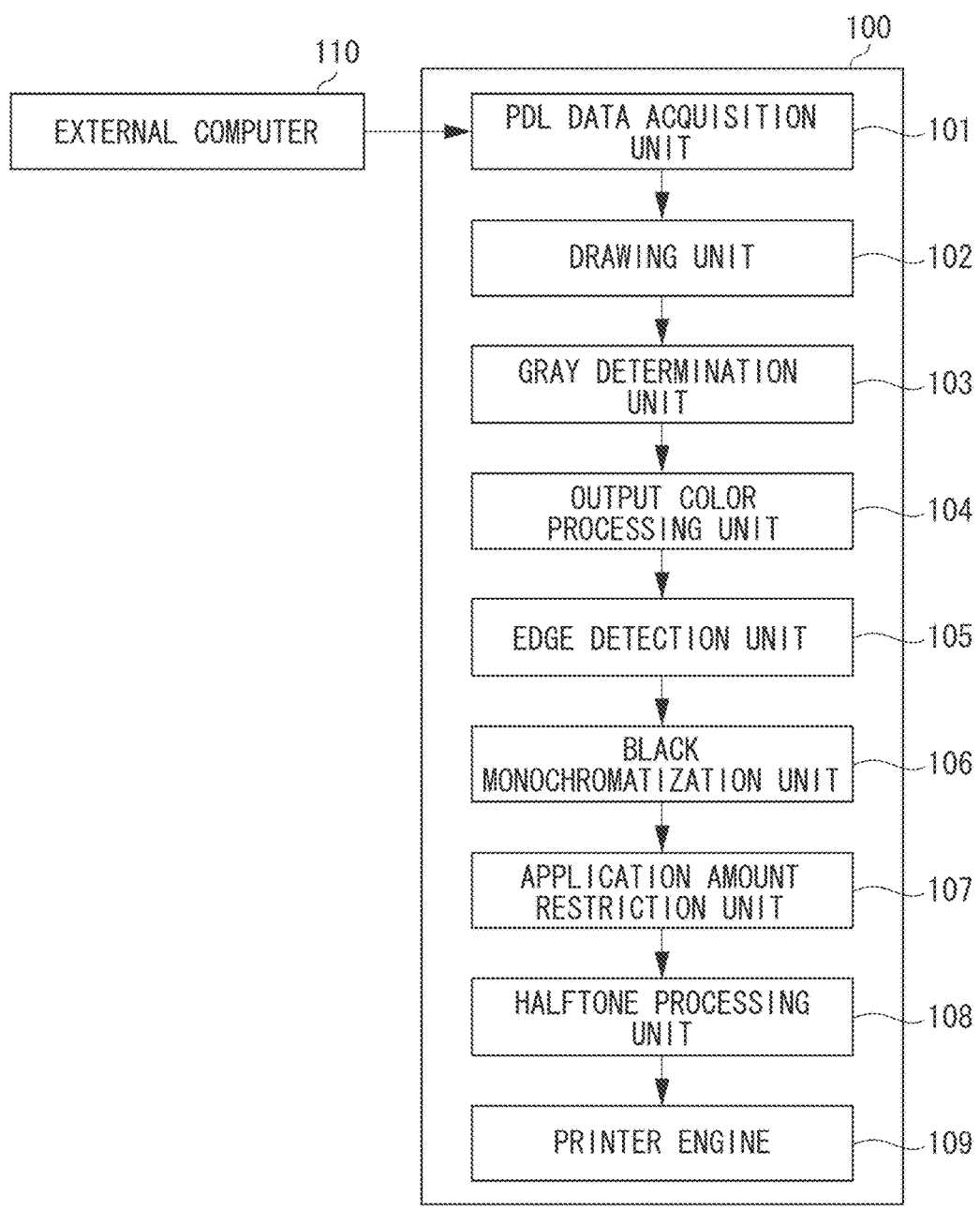
FIG. 1 illustrates a configuration of an image processing apparatus according to the present exemplary embodiment.

FIG. 1 illustrates a configuration of an image processing apparatus according to the present exemplary embodiment. The image processing apparatus 100 includes a page description language (PDL) data acquisition unit 101, a drawing unit 102, an achromatic color determination unit 103, an output color processing unit 104, an edge detection unit 105, a black monochromatization unit 106, an application amount restriction unit 107, a halftone processing unit 108, and a printer engine 109.

The image processing apparatus 100 includes a central processing unit (CPU), a read only memory (ROM), and a random access memory (RAM) therein. The CPU loads a program of the image processing apparatus 100 from the ROM, and executes the program of the image processing apparatus 100 by using the RAM as a temporary storage area. The above-described operations carry out the following processing for each of the units 101 to 108.

<PDL Data Acquisition Unit 101>

Upon reception of PDL data from an external computer 110, the PDL data acquisition unit 101 outputs the PDL data to the drawing unit 102. The PDL data contains a plurality of object drawing commands.

<Drawing Unit 102>

Based on the PDL data received from the PDL data acquisition unit 101, the drawing unit 102 generates a drawing image (a red, green and blue (RGB) image in the present example) and an attribute image, and outputs both images to the achromatic color determination unit 103. The attribute image has the same number of pixels as the drawing image in the vertical and horizontal directions, and stores information (flags) used to switch image processing for each individual pixel.

FIG. 2 illustrates an example of a data structure of an attribute image according to the present exemplary embodiment. In the example illustrated in FIG. 2, information stored in one pixel of the attribute image includes an attribute bit (1 bit), an achromatic color bit (1 bit), and an edge bit (1 bit), totaling 3 bits.

A pixel whose attribute bit is set to 1 is subjected to character processing, and may be referred to as a character pixel. A pixel whose attribute bit is set to 0 is subjected to photographic processing, and is sometimes referred to as a photographic pixel. A pixel whose achromatic color bit is set to 1 is a pixel (achromatic color pixel) having color values close to gray on the drawing image. A pixel whose achromatic color bit is set to 0 is a pixel (chromatic color pixel) not having color values close to gray. A pixel whose edge bit is set to 1 is an edge-forming pixel on the drawing image. A pixel whose edge bit is set to 0 is not an edge-forming pixel.

Generation of an attribute image will be described in detail below.

To generate an attribute image, the drawing unit 102 first prepares an initialized attribute image. The initialized attribute image refers to an attribute image whose attribute bit is set to Photographic Processing (0), achromatic color bit is set to Chromatic Color (0), and edge bit is set to No Edge (0) for all pixels.

After the initialization, the drawing unit 102 sets the attribute bit of the pixel of a drawn object. For example, in a case where the object is a character or line object, the drawing unit 102 sets the attribute bit of the pixel to Character Processing (1). In a case where an object other than character and line objects is drawn on the pixel or when no object is drawn on the pixel, the drawing unit 102 leaves the attribute bit of the pixel as set to Photographic Processing (0). For a pixel on which a plurality of objects is drawn, the drawing unit 102 overwrites both the drawing image and the attribute image with drawing command information about the last object to be drawn on the pixel (most front object).

<Achromatic Color Determination Unit 103>

The achromatic color determination unit 103 receives the RGB image and the attribute image from the drawing unit 102, and determines whether each pixel is an achromatic color pixel, based on the RGB values of each pixel in the RGB image.

For each pixel determined to be an achromatic color pixel, the achromatic color determination unit 103 updates the attribute image by setting the achromatic color bit of the pixel to Achromatic Color (1). The achromatic color determination unit 103 then outputs the RGB image and the updated attribute image to the output color processing unit 104. As for each pixel determined not to be an achromatic color pixel, the achromatic color determination unit 103 leaves the achromatic color bit as set to 0.

The achromatic color originally means a color having no tint (for example, black, white, or gray). However, a certain range in meaning may be given to the term "achromatic color." For example, if the difference between the R and the G color values, the difference between the G and the B color values, and the difference between the B and the R color values are all within a threshold value, it is determined that the pixel has an achromatic color, and other pixels have a chromatic color. Naturally, a different range in meaning may also be given to the term "achromatic color". For example, the RGB color values may be converted to the YUV color values, and if a pixel where both the U and the V values are within a threshold value, it may be determined that the pixel has an achromatic color. Thus, varieties of methods can be conceivable.

<Output Color Processing Unit 104>

The output color processing unit 104 receives the RGB image and the attribute image from the achromatic color determination unit 103, and performs color processing on the RGB image based on the attribute image, thus generating a cyan, magenta, yellow, and black (CMYK) image. Then, the output color processing unit 104 outputs the CMYK image and the attribute image to the edge detection unit 105.

For example, for each pixel whose attribute bit is set to Character Processing (1) and achromatic color bit is set to Achromatic Color (1), the output color processing unit 104 converts the RGB values of the pixel into the K monochrome (a color value including only the value for K coloring material, i.e., the CMYK values in which C=M=Y=0 and 0<K). More specifically, the output color processing unit 104 converts the RGB values of an achromatic color pixel expressed as a character or line object in the PDL data into the K monochrome. For other pixels, the output color processing unit 104 converts the RGB values into CMYK values provided that at least one of the C, the M, and the Y values is not 0.

<Edge Detection Unit 105>

The edge detection unit 105 receives the CMYK image and the attribute image from the output color processing unit 104, and detects character and line edges based on the CMYK image. The edge detection unit 105 updates the attribute image by setting the edge bit to Edge (1) for each pixel from which an edge is detected. Then, the edge detection unit 105 outputs the updated attribute image and the CMYK image to the black monochromatization unit 106. Details will be described below.

<Black Monochromatization Unit 106>

The black monochromatization unit 106 receives the CMYK image and the attribute image from the edge detection unit 105. For each pixel whose attribute bit is set to Photographic Processing (0), the achromatic color bit is set to Achromatic Color (1), and the edge bit is set to Edge (1), the black monochromatization unit 106 replaces the color values (CMYK values) of the pixel with the K monochrome. This replacement processing is referred to as black monochromatization processing. Then, the black monochromatization unit 106 outputs to the application amount restriction unit 107 the CMYK image having undergone the black monochromatization processing and the attribute image received from the edge detection unit 105.

<Application Amount Restriction Unit 107>

The application amount restriction unit 107 receives the CMYK image having undergone the black monochromatization processing and the attribute image from the edge detection unit 106, and restricts the sum total of the CMYK coloring material color values so as not to exceed a coloring material application amount limit value. The application amount restriction unit 107 outputs to the halftone processing unit 108 the CMYK image obtained as a result of the restriction and the attribute image received from the edge detection unit 106. The coloring material application amount limit for a pixel whose edge bit is Edge (1) is set to a value lower than that for a pixel whose edge bit is set to No Edge (0). Unless otherwise noted, the RGB image and the CMYK image are multi-valued images.

<Halftone Processing Unit 108 and Printer Engine 109>

The halftone processing unit 108 converts the multi-valued CMYK image received from the output color processing unit 104 into a binary CMYK image which is a latent image of coloring materials of the printer engine 109. The halftone processing unit 108 then outputs the binary CMYK image to the printer engine 109. Finally, based on the binary CMYK image received from a dither processing unit, the printer engine 109 forms coloring materials on an output medium such as paper.

<Details of Edge Detection Unit 105>

The edge detection unit 105 will be described in detail below.

The edge detection unit 105 detects character and line edges of a CMYK image. For each pixel in which character or line edge is detected, the edge detection unit 105 sets the edge bit of the pixel to Edge (1). For each pixel in which character or line edge is not detected, the edge detection unit 105 leaves the edge bit of the pixel as set to No Edge (0).

FIGS. 3A, 3B, and 3C conceptually illustrate a CMYK image on which a character is drawn, a CMYK image on which a photograph is drawn, and a CMYK image on which a photograph including a character is drawn, respectively.

FIGS. 3D, 3E and 3F illustrate results of extraction of a 9×9 target window. For each CMYK image, a single pixel is used as a target pixel and the 9×9 target window is formed of the target pixel serving as a center and surrounding pixels.

Referring to FIG. 3D, in the vicinity of a character or line edge, there are many pixels having an identical color to the target pixel, few pixels having a similar color to the target pixel, and many pixels having a different color from the target pixel. Referring to FIG. 3E, in the vicinity of an edge in the photograph, there are fewer pixels having an identical color to the target pixel, and many pixels having a similar color to the target pixel. Referring to FIG. 3F, in the vicinity of an edge of the character in the photograph, there are many pixels having an identical color to the target pixel, few pixels having a similar color to the target pixel, and many pixels having a different color from the target pixel.

Based on the above-described features, in a case where there are many pixels having an identical color to the target pixel, few pixels having a similar color to the target pixel, and many pixels having a different color from the target pixel around the target pixel, the edge detection unit 105 sets the edge bit of the attribute image to Edge (1). FIGS. 3G, 3H, and 3I illustrate results of edge detection in the drawing images illustrated in FIGS. 3A, 3B, and 3C by the edge detection unit 105, respectively. Thus, it is possible to extract only character and line edges.

The concept of edge detection will be described below. The fact that there are many pixels having an identical color to the target pixel indicates that the target pixel is a character or line. The fact that there are few pixels having a similar color to the target pixel indicates that there is no smooth density variation around the target pixel, i.e., the target pixel is not a photograph (that is, it may be a character). Further, the fact that there are many pixels having a different color from the target pixel indicates that an edge may exist around the target pixel. Although, according to the present exemplary embodiment, the target pixel is determined to be character or line edges only when all of the above-described three conditions are satisfied, only one or two out of the three conditions may be used since these conditions indicate different contents.

A pixel having an identical color to the target pixel (sometimes referred to as a pixel having the same color as the target pixel) is a pixel whose color difference (in the CMYK values in the present example) from the target pixel is smaller than a threshold value A (thA). A pixel having a similar color to the target pixel is a pixel whose color difference from the target pixel is equal to or greater than the threshold value A and smaller than a threshold value B (thB). A pixel having a different color from the target pixel is a pixel whose color difference from the target pixel is equal to or greater than the threshold value B.

There are various methods for calculating the color difference. For example, one method calculates the maximum value of differences in individual color components ($\Delta C$, $\Delta M$, $\Delta Y$, and $\Delta K$) between the CMYK values of a target pixel and the CMYK values of a selected pixel. While other methods include a method for calculating the sum of $\Delta C$, $\Delta M$, $\Delta Y$, and $\Delta K$ and a method for calculating the sum of mean square values thereof, the present invention is not limited thereto. Any calculation method is applicable as long as the color difference can be expressed.

In a case where the individual CMYK values of each pixel are represented by 8 bits (0 to 255), when the maximum value of $\Delta C$, $\Delta M$, $\Delta Y$, and $\Delta K$ is used to calculate the color difference, it is desirable to set the threshold value A to 2 or greater (for example, around 16), and set the threshold value B to around 64. However, these threshold values cannot be definitely determined since such values depend on a formula used for color conversion by the output color processing unit 104. It is therefore necessary for each designer to set suitable threshold values through experiments. To determine suitable threshold values, it is recommended to finely adjust the threshold values A and B presented by the relevant inventor while confirming whether edges are suitably extracted. It is desirable to set the threshold value A to 2 or greater since JPEG compression is assumed. Although JPEG compression is not illustrated in FIG. 1, it is conceivable that a certain system performs processing of JPEG compression, storage, and decompression between the achromatic color determination unit 103 and the output color processing unit 104. In such a case, slight variation may occur in color of a character or line which should be essentially composed of pixels having a completely identical color. To absorb such variation, it is desirable to set the threshold value A to a value greater than 1.

In the present specification, a completely identical color and an identical color (same color) have different meanings. If one pixel has a completely identical color to another pixel, the difference between the color of the one pixel and the color of another pixel is 0. On the other hand, if one pixel has an identical color to another pixel, the difference between the color of the one pixel and the color of another pixel is smaller than the threshold value A. A completely identical color may be equal to an identical color depending on the setting of the threshold value A.

<Details of Edge Detection Unit 105 (Flowchart)>

Processing by the edge detection unit 105 will be described in detail below with reference to the flowchart illustrated in FIG. 4.

In step S401, the edge detection unit 105 selects pixels one by one as a target pixel sequentially from the top left pixel, and sets an identical color pixel count value (same), a similar color pixel count value (near), and a different color pixel count value (other) to 0. In step S402, the edge detection unit 105 selects pixels within a window (for example, a 9×9 window centered around the target pixel) one by one. In step S403, the edge detection unit 105 determines whether the selected pixel and the target pixel have an identical color. When the determination condition in step S403 is satisfied (YES in step S403), then in step S404, the edge detection unit 105 increments the identical color pixel count value (same) by 1. On the other hand, when the determination condition in step S403 is not satisfied (NO in step S403), then in step S405, the edge detection unit 105 determines whether the selected pixel and the target pixel have similar colors. When the determination condition in step S405 is satisfied (YES in step S405), then in step S406, the edge detection unit 105 increments the similar color pixel count value (near) by 1. When the determination condition in step S405 is not satisfied, either (NO in step S405), then in step S407, the edge detection unit 105 increments the different color pixel count value (other) by 1. In step S408, the edge detection unit 105 determines whether all pixels in the window have been selected. When not all pixels in the window have been selected (NO in step S408), then in step S402, the edge detection unit 105 selects an unprocessed pixel. The edge detection unit 105 counts the identical color pixel count value, the similar color pixel count value, and the different color pixel count value through the above-described processing.

After counting the identical color pixel count value, the similar color pixel count value, and the different color pixel count value, the edge detection unit 105 compares these count values with threshold values. In step S409, the edge detection unit 105 determines whether (the identical color pixel count value≥threshold value 1 (th1)) and (the similar color pixel count value≤threshold value 2 (th2)) and (the different color pixel count value≥threshold value 3 (th3)). When the determination condition in step S409 is satisfied (YES in step S409), then in step S410, the edge detection unit 105 determines that the target pixel is an edge and sets the edge bit of the attribute image to 1.

In step S411, the edge detection unit 105 determines whether all pixels have been selected as a target pixel. When not all pixels have been selected as a target pixel (NO in step S411), then in step S401, the edge detection unit 105 selects an unprocessed pixel. When the above-described processing in steps S401 to S411 has been performed on all pixels, only character and line edges in the CMYK image are detected.

In this case, it is desirable to set the threshold value 1 to around 5, set the threshold value 2 to around 2, and set the threshold value 3 to around 5. However, these threshold values cannot be definitely determined since they depend on the window size and the settings of the threshold values A and B. It is therefore necessary for each designer to set suitable threshold values through experiments. To determine suitable threshold values, it is recommended to finely adjust the threshold values 1, 2, and 3 presented by the relevant inventor while confirming whether edges are suitably extracted or not.

<Details of Black Monochromatization Unit 106>

The black monochromatization unit 106 will be described in detail below.

The black monochromatization unit 106 refers to the attribute image of each pixel. For each pixel whose attribute bit is set to Photographic Processing (0), achromatic color bit is set to Achromatic Color (1), and edge bit is set to Edge (1), the black monochromatization unit 106 replaces the color values (CMYK values) of the pixel with the K monochrome. In this case, the K value after the replacement may be, for example, K+(C+M+Y)/3 by using the CMYK values before the replacement. As another example, the K value after the replacement is performed may be obtained by using a table for minimizing the difference in density of an output image of the printer engine 109 between a case where the replacement has been performed and a case where the replacement has not been performed. For each pixel whose attribute bit is set to Character Processing (1), achromatic color bit is set to Chromatic Color (0), and edge bit is set to No Edge (0), the black monochromatization unit 106 leaves the CMYK values unchanged.

With the above-described processing, the black monochromatization unit 106 can output the pixel visually equivalent to a character or line in black monochrome, even with an achromatic color pixel which has not been converted into the K monochrome (a pixel which has not been determined to be a character or line object in the PDL data) by the output color processing unit 104. This enables reducing color blur on character and line edges due to misregistration in the printer engine 109, while richly reproducing achromatic color portions in a photograph. As a result, character and line edges can be clearly expressed.

<Details of Application Amount Restriction Unit 107>

The application amount restriction unit 107 will be described in detail below.

For the pixel whose edge bit is set to Edge (1), the application amount restriction unit 107 sets the CMYK values of the pixel to a value lower than the coloring material application amount limit of a pixel where the edge bit is set to No Edge (0), thus performing application amount restriction processing. (More specifically, for the pixel having a coloring material application amount equal to or greater than the limit value, the application amount restriction unit 107 reduces the coloring material application amount of the pixel to the limit value.) As described above, by decreasing the coloring material application amount limit only for character and line edges, blur in character and line edges due to scattering of coloring material by the printer engine 109 can be reduced, while maintaining the reproducibility of dark portions in a photograph. In other words, character and line edges can be clearly expressed.

<Details of Halftone Processing Unit 108>

The halftone processing unit 108 will be described in detail below.

For each pixel, the halftone processing unit 108 refers to the attribute image, and converts the drawing image (the multi-valued CMYK image) into the binary CMYK image.

For the pixel whose edge bit is set to No Edge (0), the halftone processing unit 108 coverts the drawing image into the binary CMYK image by using low Line Per Inch (LPI) dither. On the other hand, for the pixel whose edge bit is set to Edge (1), the halftone processing unit 108 obtains the logical "OR" of the result of conversion into the binary CMYK image by using low LPI dither and the result of conversion into the binary CMYK image by using dither having higher LPI than high LPI dither, and sets the resultant value as a binary conversion result. This processing enables reproducing a photograph and the inside of a character by using low LPI dither. Thus, while roughness and density rise in edges of the photograph can be prevented, jaggies in character and line edges can be reduced by using high LPI dither. Character and line edges become slightly dense and sharp.

According to the present exemplary embodiment, it is possible to carry out black monochromatization, change the application amount limit value, and perform binarization processing with suitable dither on character and line edges, while reducing unnatural contours of edges in a photograph caused by edge processing.

Figure 4:
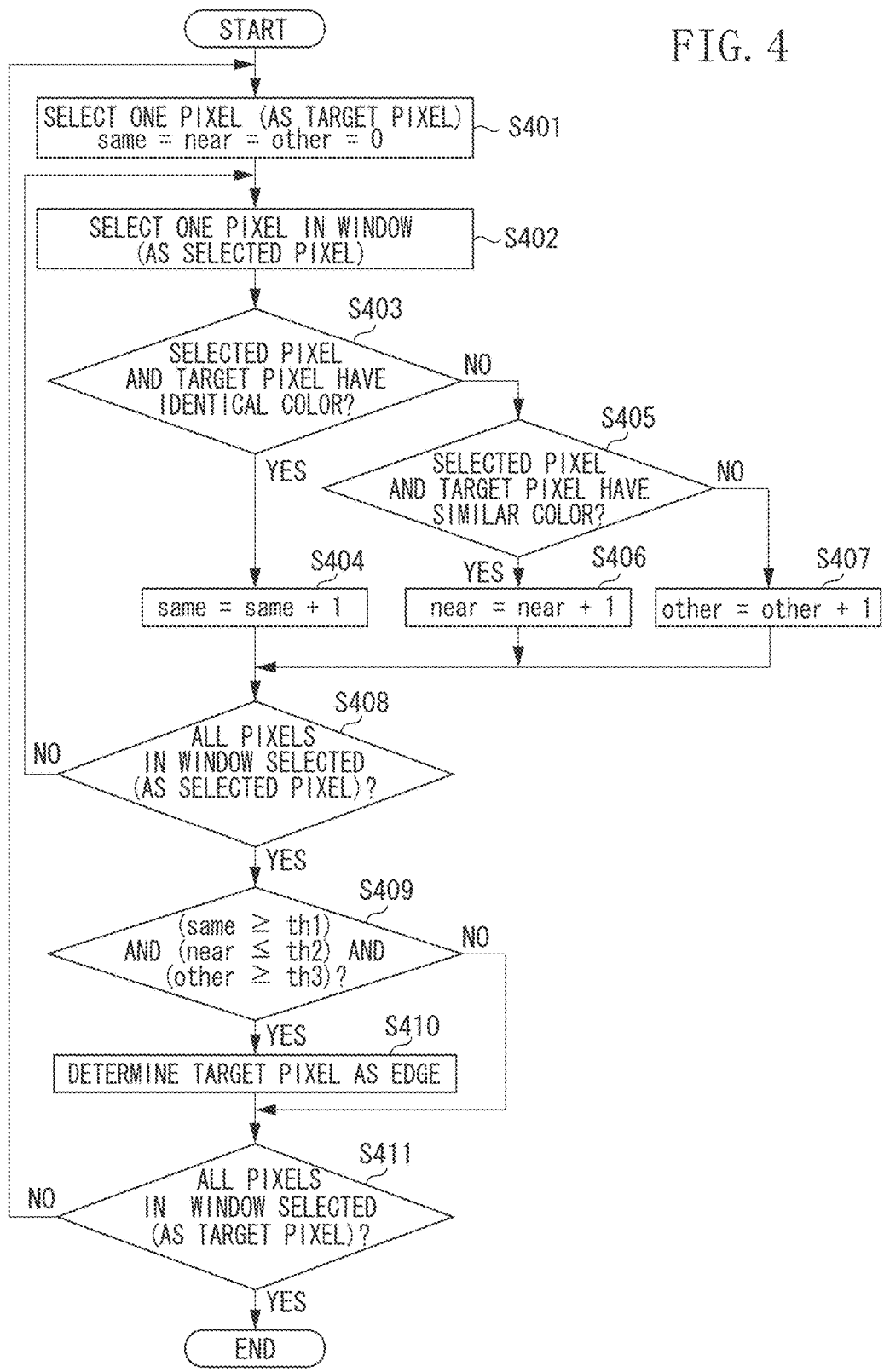
FIG. 4 is a flowchart illustrating processing by an edge detection unit according to the present exemplary embodiment.

According to the flowchart illustrated in FIG. 4, not only character and line edges but also portions surrounding the edges are determined to be an edge. This enables applying the processing by the black monochromatization unit 106 and the application amount restriction unit 107 to the surrounding portion of an outline character.

A second exemplary embodiment will be described below. The following describes an example of an image processing apparatus according to the second exemplary embodiment. The black monochromatization unit 106 and the application amount restriction unit 107 use a result of edge detection in which photographic edge detection is restricted and only character and line edges are detected. The halftone processing unit 108 uses a result of other edge detection. According to the second exemplary embodiment, bordering of photographic edges as well as bordering for each coloring material can be controlled.

The present exemplary embodiment is similar to the first exemplary embodiment in the configuration from the PDL data acquisition unit 101 to the application amount restriction unit 107, the printer engine 109, and the external computer 110. The present exemplary embodiment is different from the first exemplary embodiment only in the configuration of the halftone processing unit 108, which will be described in detail below.

Figure 5:
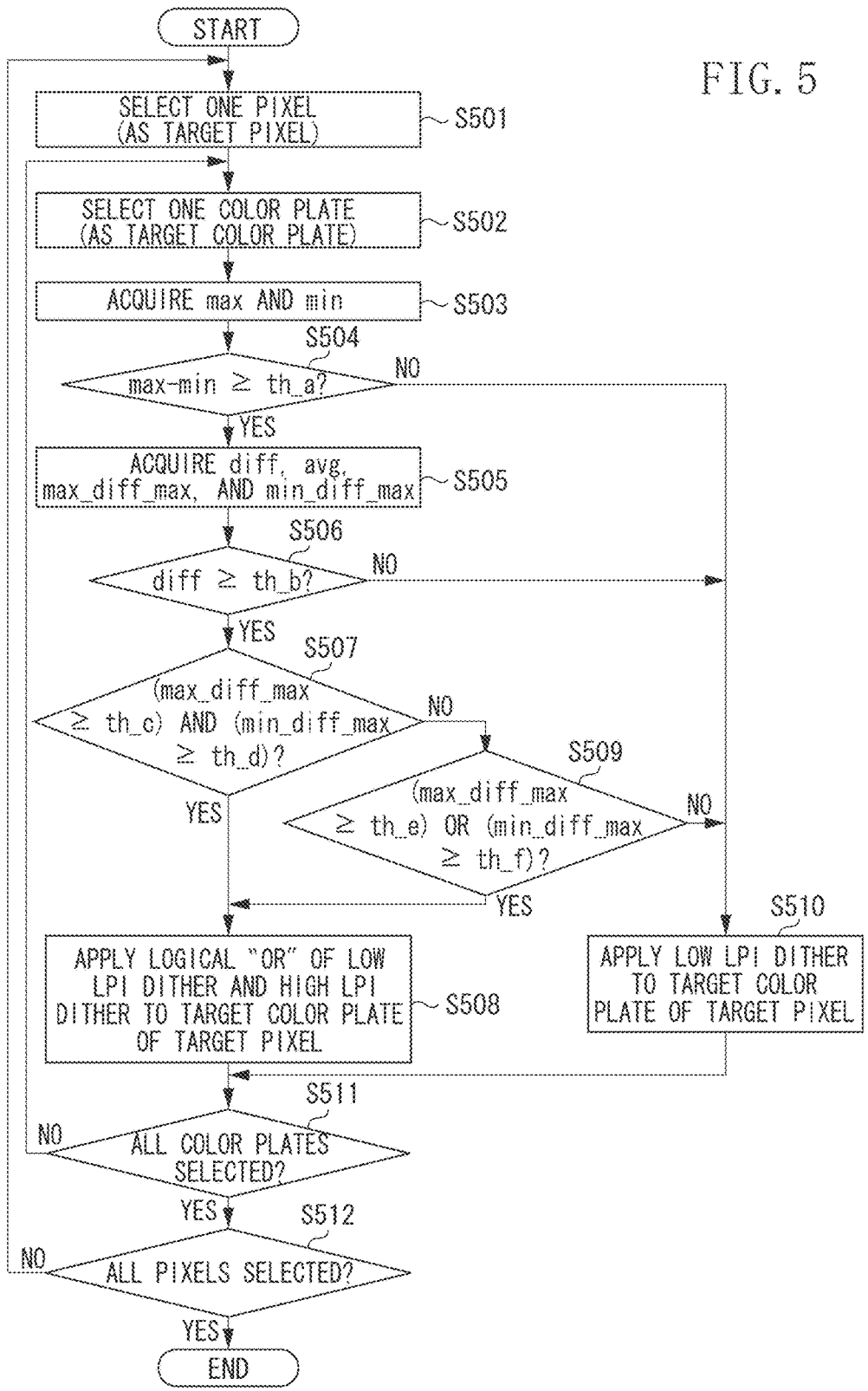
FIG. 5 is a flowchart illustrating processing by a halftone processing unit according to a second exemplary embodiment.

The halftone processing unit 108 will be described in detail below with reference to the flowchart illustrated in FIG. 5.

In step S501, the halftone processing unit 108 selects pixels of a drawing image one by one as a target pixel sequentially from the top left pixel. In step S502, the halftone processing unit 108 selects color plates one by one as a target color plate out of the C, the M, the Y, and the K plates of the drawing image. In step S503, the halftone processing unit 108 calculates the maximum value (max) and the minimum value (min) of pixels within a window (for example, a 3×3 window centered around the target pixel). In step S504, the halftone processing unit 108 determines whether the difference between max and min is equal to or greater than a threshold value a (th_a). When the determination condition in step S504 is satisfied (YES in step S504), then in step S505, the halftone processing unit 108 sets the difference between max and min as diff, sets the average value of max and min as avg, sets as max_diff_max the pixel value of a pixel having the minimum pixel value out of pixels which have a greater pixel value than avg, and sets as min_diff_max the pixel value of a pixel having the maximum pixel value out of pixels which have a smaller pixel value than avg. In step S506, the halftone processing unit 108 determines whether diff is equal to or greater than a threshold value b (th_b). When the determination condition in step S506 is satisfied (YES in step S506), then in step S507, the halftone processing unit 108 determines whether max_diff_max is equal to or greater than a threshold value c (th_c) and min_diff_max is equal to or greater than a threshold value d (th_d). When the determination condition in step S507 is satisfied (YES in step S507), then in step S508, the halftone processing unit 108 applies the dither obtained from the logical "OR" of low LPI dither and high LPI dither to the target color plate of the target pixel. On the other hand, when the determination condition in step S507 is not satisfied (NO in step S507), then in step S509, the halftone processing unit 108 determines whether max_diff_max is equal to or greater than a threshold value e (th_e) or min_diff_max is equal to or greater than a threshold value f (th_f). When the determination condition in step S509 is satisfied (YES in step S509), then in step S508, the halftone processing unit 108 applies the dither obtained from logical "OR" of low LPI dither and high LPI dither to the target color plate of the target pixel. When the determination condition in step S504 is not satisfied (NO in step S504), or when the determination condition in step S506 is not satisfied (NO in step S506), or when the determination condition in step S509 is not satisfied (NO in step S509), then in step S510, the halftone processing unit 108 applies low LPI dither to the target color plate of the target pixel. In step S511, the halftone processing unit 108 determines whether all of color plates have been selected as a target color plate. When not all of color plates have been selected (NO in step S511), then in step S502, the halftone processing unit 108 selects an unprocessed color plate as a target color plate. In step S512, the halftone processing unit 108 determines whether all of pixels have been selected as a target pixel. When not all of pixels have been selected (NO in step S512), then in step S501, the halftone processing unit 108 selects an unprocessed pixel as a target pixel. The halftone processing unit 108 coverts the drawing image (multi-valued CMYK image) into the binary CMYK image by performing the processing in steps S501 to S512 on each of the C, the M, the Y, and the K plates.

The configuration of the halftone processing unit 108 according to the present exemplary embodiment is not limited to the above-described configuration. As another example, the halftone processing unit 108 may use an edge detection filter for the RGB image, and apply low LPI dither to a pixel having an edge amount equal to or smaller than a threshold value and apply high LPI dither to a pixel having an edge amount equal to or greater than the threshold value. The color space in edge detection is not limited to the CMYK color space, and other color spaces such as the gray scale color space are also applicable.

According to the present exemplary embodiment, it becomes possible to perform black monochromatization and change the application amount limit value only with respect to character and line edges. The bordering of photographic edges can be adjusted, and control of each coloring material of a printer can be performed.

According to the first and the second exemplary embodiments, the attribute bit when a graphic object is drawn by the drawing unit 102 may be set to Character Processing (1). This also enables reproducing the inside of a gray object specified as a graphic in the PDL data by only using the K coloring material.

The first and the second exemplary embodiments may have the following configuration. The output color processing unit 104 converts the color values of the drawing image into color values reproduced with the CMY values (3 colors) or the CMYK values (4 colors) (i.e., 0<C, 0<M, and 0<Y) even when color values close to gray are constantly input regardless of the attribute bit of the attribute image. The black monochromatization unit 106 refers to the attribute image of each pixel. For each pixel whose achromatic color bit is set to Achromatic Color (1) and edge bit is set to Edge (1), or for each pixel whose achromatic color bit is set to Achromatic Color (1) and attribute bit is set to Character Processing (1), the black monochromatization unit 106 replaces the pixel value of the pixel only with the K plate. This enables preventing a color difference due to the difference of the processing in the output color processing unit 104 even in a case where a photographic processing region and a character processing region, both having the same gray, are adjacent each other.

According to the first and the second exemplary embodiments, the image processing apparatus 100 may be configured such that the edge detection unit 105 is disposed between the drawing unit 102 and the output color processing unit 104, and the achromatic color determination unit 103 and the black monochromatization unit 106 are not provided. In a case where the drawing image is an RGB image, the method for calculating the color difference performed by the edge detection unit 105 may possibly be based on the maximum value, the sum, or the square average sum of differences in each color component between the RGB values of a target pixel and the RGB values of a selected pixel. However, any calculation method is applicable as long as the color difference can be expressed. This also applies to a drawing image whose color values are defined in the L*a*b* color space or the XYZ color space. Further, the color difference may be calculated based only on the difference in luminance regardless of the color space of the drawing image. For each pixel whose attribute bit is set to Character Processing (1) or edge bit is set to Edge (1), the output color processing unit 104 converts the color values of the pixel into color values including only the K coloring material in a case where color values close to gray are input. Furthermore, for each pixel whose attribute bit is set to Photographic Processing (0) and edge bit is set to Edge (1), the output color processing unit 104 converts the color values into color values reproduced with the CMY values (3 colors) or the CMYK values (4 colors) even in a case where color values close to gray are input. This configuration also enables obtaining a result equivalent to the results obtained according to the first and the second exemplary embodiments.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one controller, having one or more processors which execute instructions stored in a memory, one or more circuitries, or a combination of the one or more processors and the one or more circuitries, being configured to:
obtain, in a target window in image data, a first number of pixels each having an identical color to a color of a target pixel and a second number of pixels each having a different color from the color of the target pixel,
perform a first determination process of determining whether the obtained first number of pixels each having the identical color is higher than a first predetermined value,
perform a second determination process of determining whether the obtained second number of pixels each having the different color is higher than a second predetermined value,
determine that the target pixel belongs to an edge in a case where the first number is higher than the first predetermined value and the second number is higher than the second predetermined value, and determine that the target pixel does not belong to the edge in a case where the first number is lower than the first predetermined value and the second number is higher than the second predetermined value, and
perform edge correction processing on the target pixel which is determined to belong to the edge,
wherein a pixel having the identical color has information based on a pixel value of which a difference from information based on a pixel value of the target pixel is smaller than a first threshold, and
wherein a pixel having the different color has information based on a pixel value of which a difference from information based on the pixel value of the target pixel is larger than a second threshold which is larger than the first threshold.

2. The image processing apparatus according to claim 1, wherein the at least one controller is further configured to:
obtain, in the target window, a third number of pixels having a similar color to the color of the target pixel,
perform a third determination process of determining whether the obtained third number of pixels having the similar color is lower than a third predetermined value,
determine that the target pixel belongs to an edge in a case where the first number is higher than the first predetermined value, the second number is higher than the second predetermined value, and the third number is lower than the third predetermined value, and
perform the edge correction processing on the target pixel which is determined to be a pixel that belongs to the edge,
wherein a pixel having the similar color has a pixel value of which a difference from the pixel value of the target pixel is larger than the first threshold and smaller than the second threshold.

3. The image processing apparatus according to claim 1, wherein a pixel in the image data includes a plurality of color components, and
wherein a sum of differences of pixel values in individual color components from the target pixel is determined as the difference from the pixel value of the target pixel.

4. The image processing apparatus according to claim 1, wherein a pixel in the image data includes a plurality of color components,
wherein a difference from the pixel value of the target pixel for each color component is determined,
wherein a maximum value of differences in individual color components is determined, and
wherein the pixel having the identical color has a pixel value of which the maximum value of differences is smaller than the first threshold.

5. The image processing apparatus according to claim 1, wherein a pixel in the image data includes a plurality of color components,
wherein a difference from the pixel value of the target pixel in each color component is determined,
wherein a maximum value of differences in individual color components is determined, and
wherein the pixel having the different color has a pixel value of which the maximum value of differences is larger than the second threshold.

6. The image processing apparatus according to claim 1, wherein the edge correction processing to be performed is black monochromatic processing.

7. The image processing apparatus according to claim 1, wherein the edge correction processing to be performed is application amount restriction processing.

8. An image processing method comprising:
obtaining, in a target window in image data, both of a first number of pixels each having an identical color to a color of a target pixel and a second number of pixels each having a different color from the color of the target pixel;
determining whether the first number of pixels each having the identical color obtained by the obtaining is higher than a first predetermined value;
determining whether the second number of pixels each having the different color obtained by the obtaining is higher than a second predetermined value;
determining that the target pixel belongs to an edge in a case where the first number is higher than the first predetermined value and the second number is higher than the second predetermined value, and determining that the target pixel does not belong to the edge in a case where the first number is lower than the first predetermined value and the second number is higher than the second predetermined value; and
performing edge correction processing on the target pixel which is determined to belong to the edge,
wherein a pixel having the identical color has information based on a pixel value of which a difference from information based on a pixel value of the target pixel is smaller than a first threshold, and
wherein a pixel having the different color has information based on a pixel value of which a difference from information based on the pixel value of the target pixel is larger than a second threshold which is larger than the first threshold.

9. An image processing method comprising:
obtaining, for each respective target pixel of a plurality of target pixels in a target window in image data, both of a respective first number of pixels each having an identical color to a color of the respective target pixel and a respective second number of pixels each having a different color from the color of the respective target pixel;
detecting an edge in the image data based on at least whether the respective first number of each target pixel of the plurality of target pixels is higher than a first predetermined value and whether the respective second number of each target pixel of the plurality of target pixels is higher than a second predetermined value, wherein, for each respective target pixel of the plurality of target pixels,
the respective target pixel belongs to the edge in a case where the respective first number of the respective target pixel is higher than the first predetermined value and the respective second number of the respective target pixel is higher than the second predetermined value, and
the respective target pixel does not belong to the edge in a case where the respective first number of the respective target pixel is lower than the first predetermined value and the respective second number of the respective target pixel is higher than the second predetermined value; and
performing correction processing on the detected edge,
wherein a pixel having the identical color has information based on a pixel value of which a difference from information based on a pixel value of the respective target pixel is smaller than a first threshold, and
wherein a pixel having the different color has information based on a pixel value of which a difference from information based on the pixel value of the respective target pixel is larger than a second threshold which is larger than the first threshold.

* * * * *